United States Patent
Schoneveld et al.

(10) Patent No.: US 9,777,163 B2
(45) Date of Patent: Oct. 3, 2017

(54) COMPOSITION FOR COATING (75) Inventors: Erik Schoneveld, Valencia (ES); Francisco Antonio Sanchis Brines, Valencia (ES); Amaya Ortega Murguialday, Valencia (ES); Julio Gómez Cordón, Valencia (ES); Maria Dolores Lorente Aroca, Valencia (ES); Diana Cordero Etchaberry, Valencia (ES)

(73) Assignee: SILICALIA, SL, Valencia (ES)

( * ) Notice: Subject to any disclaimer, the term of this patent is extended or adjusted under 35 U.S.C. 154(b) by 823 days.

(21) Appl. No.: 13/515,539

(22) PCT Filed: Dec. 15, 2010

(86) PCT No.: PCT/IB2010/003246
§ 371 (c)(1),
(2), (4) Date: Jul. 27, 2012

(87) PCT Pub. No.: WO2011/077211
PCT Pub. Date: Jun. 30, 2011

(65) Prior Publication Data
US 2012/0328875 A1 Dec. 27, 2012

(30) Foreign Application Priority Data
Dec. 23, 2009 (EP) .................................. 09380197

(51) Int. Cl.
| C09D 5/00 | (2006.01) |
| C09D 183/08 | (2006.01) |
| B82Y 30/00 | (2011.01) |
| C09D 7/12 | (2006.01) |
| C09D 183/06 | (2006.01) |
| C08G 77/14 | (2006.01) |

(Continued)

(52) U.S. Cl.
CPC ............... *C09D 5/00* (2013.01); *B82Y 30/00* (2013.01); *C09D 7/1216* (2013.01);
(Continued)

(58) Field of Classification Search
CPC combination set(s) only.
See application file for complete search history.

(56) References Cited

U.S. PATENT DOCUMENTS

2003/0186066 A1* 10/2003 Monkiewicz ........ C08K 5/5415
428/447
2006/0270758 A1* 11/2006 Ong ....................... B29C 67/242
523/171
(Continued)

FOREIGN PATENT DOCUMENTS

| EP | 1832629 A | 9/2007 |
| EP | 2085442 A | 8/2009 |

(Continued)

OTHER PUBLICATIONS

Mosquera et al, Mater. Res. Soc. Symp. Proc., vol. 852, pp. 81-87 (OO6.4.1-OO6.4.7), 2005.*

(Continued)

*Primary Examiner* — Erma Cameron
(74) *Attorney, Agent, or Firm* — Robert J. Hess; Hess Patent Law Firm (57) ABSTRACT

The method consists of the formation of a layer over a stone substrate to increase its hardness, chemical resistance, wear and scratch resistance, comprising applying on the substrate a coating matrix incorporating an organic material and fillers including inorganic nanoparticles and/or microparticles; chemically binding said matrix to the substrate, by a self-assembly process and/or a binding process by covalent bonding, electrostatic bonding, van der Waals bonding or hydrogen bonds; and finally drying said matrix. The mentioned organic material is selected from organosilanes, organophosphates, polycarboxylic compounds, compounds based on triazine heterocycles and said nanoparticles are nanoparticles of oxides, carbides, borides, nitrides of metals or of semimetals.

15 Claims, 5 Drawing Sheets

(51) Int. Cl.
*C08K 3/00* (2006.01)
*C08K 3/14* (2006.01)
*C08K 3/22* (2006.01)
*C08K 3/28* (2006.01)
*C08K 3/34* (2006.01)
*C08K 3/36* (2006.01)
*C08K 3/38* (2006.01)

(52) U.S. Cl.
CPC ......... *C09D 183/06* (2013.01); *C09D 183/08* (2013.01); *C08G 77/14* (2013.01); *C08K 3/0008* (2013.01); *C08K 3/14* (2013.01); *C08K 3/22* (2013.01); *C08K 3/28* (2013.01); *C08K 3/34* (2013.01); *C08K 3/36* (2013.01); *C08K 3/38* (2013.01); *Y10T 428/269* (2015.01); *Y10T 428/31663* (2015.04); *Y10T 428/31942* (2015.04)

(56) References Cited

U.S. PATENT DOCUMENTS

| | | | |
|---|---|---|---|
| 2007/0254178 A1* | 11/2007 | Nun | 428/540 |
| 2009/0198000 A1* | 8/2009 | Weinelt et al. | 524/188 |
| 2010/0092686 A1* | 4/2010 | Laryea | C08G 18/3206 427/458 |

FOREIGN PATENT DOCUMENTS

| | | |
|---|---|---|
| WO | 2006/008739 A | 1/2006 |
| WO | 2006/010663 A | 2/2006 |
| WO | 2006/042116 A | 4/2006 |
| WO | 2007/102960 A | 9/2007 |
| WO | 2008/085550 A | 7/2008 |
| WO | 2009/032988 A | 3/2009 |

OTHER PUBLICATIONS

Manoudis, Surface and Coatings Technology, 203, pp. 1322-1328, available online Nov. 13, 2008.*
Kim et al, Journal of Cultural Heritage, 10, pp. 214-221, available onlilne May 22, 2009 (see Abstract).*
Escalante et al, 9$^{th}$ International Congress on the Deterioation and Conservation of Stone, pp. 459-465, 2000.*
Miliani et al, Journal of Cultural Heritage, 8, pp. 1-6, 2007.*
Cogan et al, Chemical and Engineering News, 24(18), pp. 2499-2501 1946.*
Manoudis et al, Journal of Nano Research, 8, pp. 23-33, available online Sep. 2, 2009.*
Manoudis et al, Appl Phys A, 97, pp. 351-360, published online Apr. 26, 2009.*

* cited by examiner

Microcomposite

SUBSTRATE

Micro & nanocomposite

SUBSTRATE

FIG. 8

COMPOSITION FOR COATING

FIELD OF THE ART

The present invention relates, in a first aspect, to a method for coating a stone substrate, the latter being understood in this description as a natural marble or a stone aggregate comprising calcareous materials and/or dolomitic limestones agglomerated by means of a binder, the method providing a coating layer which increases the hardness, increases chemical resistance, wear and scratch resistance of said stone substrate. The coating of this invention improves the stability of the surface against the etching by chemical products and reduces stains.

The process of the invention allows both increasing the service life, in optimal conditions, of stone substrates such as an artificial marble slab, and considerably extending the scope of use of such products (given the indicated resistance of the exposed surface to multiple factors) as well as reducing the number of scratched or defective pieces during the handling, transport and installation.

The method of said first aspect of the invention provides a coating based on self-assembly technology which allows connecting materials with nanostructures.

A second aspect of the invention concerns to an element in the form of a board made of stone material incorporating a coating formed according to the proposed method.

In a third aspect the invention supplies a composition for coating an element in the form of a board made of stone material, the composition comprising a first organosilane material and inorganic nanoparticles and/or microparticles bound in a matrix by means of a self-assembly process.

PRIOR STATE OF THE ART

In the current process for obtaining artificial marble slabs, mixtures of marble aggregates with perfectly controlled granulometry which represent more than 90% of the composition of the material are used. Thermosetting resins, previously conditioned with catalysts and accelerants, are generally used as a binder element of the fillers. Due to the petrographic nature of the minerals used and the intrinsic properties of the polyester resins, artificial marble pavings have a low chemical resistance, wears and scratches occurring which reduce the service life of the substrate. Scratch and wear resistance can be related to the hardness of the material or resistance presented by a material upon being scratched by another one which is defined as the Mohs scratch and abrasion resistance of the material. This condition is one of the main drawbacks of Marble type stone substrates, both of natural and agglomerate marble.

Traditional transparent coatings based on silicones or other polymers have a good resistance against isolated impacts or aggressions, but have a low resistance when they are subjected to constant stresses, such as the passage areas, due to the low abrasion and scratch resistance of the products based on silicones and plastics.

There are different technologies to solve said drawback. Fillers (wollastonite, nanoclays) slip agents or additives based on silicone are generally used in bulk. These techniques are only valid for applications with low wear requirements. When greater wear resistances are required technologies of coatings of resins with inorganic fillers and laminates are used. But this solution generates a surface with a plastic visual appearance which is poorly appreciated in the market of high end decoration products.

The use of coatings is one of the most advanced technologies. Coatings are generally applied to protect, improve or decorate different products. However, there is a low adhesion between the coating and the polymer material due to the low polarity of the latter. The way to increase this adhesion generally involves increasing the surface energy of the plastic through different methods: exposure to high energy sources such as flame, corona, plasma and UV radiation treatment. Generally, it is easier for a surface with high surface energy to be "wet" by the coating, therefore it will be easier to paint the substrate and the adhesion between both phases will be improved. Nevertheless, there are still drawbacks when using these methods, mainly due to environmental reasons, to the fact that they are slow and not very uniform processes, in addition to the existence of limitations due to the fact that these materials are not very heat-stable.

Special coating processes such as Physical Vapour Deposition (PVD), Chemical Vapour Deposition (CVD), and Wet Deposition Coating (or sol-gel), are well known technologies to deposit inorganic coatings ($SiO_2$, carbides, nitrides, metal oxides, . . . ) on different substrates including plastics. However, on plastic materials this type of technology has certain limitations such as its high cost, low deposition speed, high energy consumption and toxic gas production, among others.

U.S. Pat. No. 5,751,018 discloses a method comprising applying a semiconductor layer, by means of a SAM process, on an inorganic substrate. In particular, it proposes covalently binding bridging moieties, through a first functional group, to the surface of the inorganic substrate and, by means of its other functional group, to semiconductor nanocrystals, also covalently. The teachings of this patent are not applicable to a coating for stone substrates, since neither the nature of said substrate nor the demands of the coating are considered.

Application WO2004094303A2 proposes joining two articles by means of nanofibers, wherein for an embodiment, one of the articles is made of stone. In its specification it is indicated that a SAM process in collaboration with microcontact printing techniques to construct the nanofibers can be used for this joining.

Application EP1802455A2 proposes applying an aluminum phosphate coating to a substrate. In its specification it is indicated that such coating, among others, supplies a greater hardness. It is also indicated that an additional coating layer, "overcoating", can be applied to said coating by means of a self-assembly monolayer or SAM process. Such additional layer can include organic molecules or polymers, coatings based on silane, as well as the proposed aluminum phosphate material itself. It is also indicated that the proposed coating can have organic or inorganic additives, such as metal ions such as silicon, iron, zinc and manganese or a mixture thereof, as well as nanocrystalline zinc, titanium oxides or a mixture thereof.

Given the insufficiencies in the mentioned prior state of the art relating to the protection of a stone substrate, a novel coating has been developed in which a high-resistance chemical bond which is covalent, electrostatic, by van der Waals forces, etc., is produced between a stone substrate comprising an aggregate of calcareous materials and/or dolomitic limestones and the transparent coating, reaching resistances similar to quartz slabs with a visual appearance of stone.

DESCRIPTION OF THE INVENTION

The invention provides a method for coating a stone substrate by means of the formation thereon of a coating layer to increase the hardness, wear and scratch resistance of said substrate. The proposed coating also makes the surface more resistant to etching and staining.

The mentioned stone substrate is based, for a preferred embodiment, on a mixture of stone aggregates with calcareous materials and/or dolomitic limestones, agglomerated by means of a binder.

The method comprises the following steps:

applying on said substrate a coating matrix incorporating at least one organic material and fillers including inorganic nanoparticles and/or microparticles;

chemically binding said matrix to the substrate by means of conducting a self-assembly process and/or by means of a binding process by covalent bonding, electrostatic bonding, van der Waals bonding or hydrogen bonds; and drying said matrix by suitable means, generally by means of supplying heat energy, with the particularity that said organic material, which is at least one in number, and/or said nanoparticles and/or microparticles have molecules with at least one of the following groups: Si—OH, SiOR (R=organic compound) or Si—Cl, aldehyde or ketone or COOH, $NH_2$, phosphates, phosphonates, sulfonates, sulfates, or the combination thereof.

Thus and in essence, the method of this invention consists of the formulation of nanostructured coatings by means of a self-assembly process from organic and inorganic precursors with the ability to form a three-dimensional lattice, which is firmly bound to the substrate by chemical bonds encapsulating different nanoparticles and/or microparticles and obtaining coatings with high abrasion and scratch resistance.

In relation to the organic material, it is selected, according to an embodiment, from organosilanes, organophosphates, polycarboxylic compounds, compounds based on triazine heterocycles and said nanoparticles are nanoparticles of oxides, carbides, borides, nitrides of metals or semimetals, selected from the group including: alumina, boron carbide, boron nitride, silicates, glass microspheres, silicon carbide, silica, quartz, copper oxide, micro- and nanofibers, core-shell particles, n-$Na_2SiO_3$ or a combination thereof functionalized with the components of said nanoparticles and/or microparticles.

The coating matrix further comprises an organic or inorganic binder and an organic or inorganic solvent.

Said binder is particularly a thermosetting aqueous-based polymer and said solvent is an aqueous or alcoholic medium and said thermosetting polymer is based on triazine heterocycles, such as methoxylated melamine.

In relation to the methodology for applying the coating matrix, it is performed by means of a co-deposition of organic material and nanoparticles and/or microparticles.

For the purpose of accelerating a dehydration process of free functional groups and improving the cross-linking thereof during the drying of the mentioned matrix, the method further comprises a controlled heat application to the coated substrate.

A second aspect of the invention concerns to an element in the form of a board comprising a natural calcareous substrate or a stone agglomerate integrating calcareous materials and/or dolomitic limestones with a coating layer formed with the proposed method by the first aspect of the invention.

According to an embodiment, the agglomerate of the substrate of the board made of stone material proposed by the second aspect of the invention comprises powder of calcareous and/or dolomitic materials and a binder resin.

For another embodiment, the mentioned coating layer comprises inorganic micro- and/or nanoparticles with great hardness trapped in the mentioned matrix, of at least one material of the group of materials including: alumina, boron carbide, boron nitride, silicates, glass microspheres, silicon carbide, silica, quartz, copper oxide, micro- and nanofibers, core-shell particles, n-$Na_2SiO_3$, or a combination thereof.

The invention also concerns, according to a third aspect, to a composition for coating a element in the form of a board made of stone material such as the one just described, and comprising a first organosilane material and inorganic nanoparticles and/or microparticles, having molecules with at least one of the following groups: Si—OH, SiOR (R=organic compound) or Si—Cl, aldehydes or ketones CO or COOH, phosphates, phosphonates, sulfonates, sulfates wherein said nanoparticles and organosilane material are bound in a matrix by means of conducting a self-assembly process and/or other chemical bond or electrostatic or chemical interaction processes.

The composition proposed by the third aspect also comprises, for an embodiment, an aqueous-based organic binder, an aqueous, alcoholic, hydroalcoholic solvent and a reaction accelerator.

In relation to the mentioned first organosilane material, it is, for a preferred embodiment, an organofunctionalized silane selected from the group of materials including: TEOS (tetraethyl orthosilicate), gamma-methacryloxypropyltrimethoxysilane, BTSE (1,2-bis triethoxysilane), hexadecyltrimethoxysilane, (3-glycidoxypropyltrimethoxysilane), dichlorodiphenylsilane, dichlorodimethylsilane; organophosphonates, polycarboxylic compounds, compounds based on triazine heterocycles or an organic material having triazine groups selected from 1,3,5-triazine or having free amino groups, selecting diamino-PEG from this group. In addition, the mentioned nanoparticles and microparticles are selected from the group of materials including: alumina, boron carbide, boron nitride, silicates, glass microspheres, silicon carbide, silica, quartz, copper oxide, micro- and nanofibers, core-shell particles, n-$Na_2SiO_3$, or a combination thereof.

The composition proposed by the third aspect of the invention contemplates that, according to a preferred embodiment, the nano- and microparticles forming it, jointly or alternatively, are functionalized with phosphonates, amino, aldehyde, sulfonates, sulfates, carboxyl groups or organosilanes.

In relation to the organic binder, a thermosetting polymer with reactive functional groups is used.

The previous and other advantages and features will be more fully understood from the following detailed description of several embodiments with reference to the attached drawings, which must be taken as a non-limiting illustration.

DETAILED DESCRIPTION OF SEVERAL EMBODIMENTS

The invention provides a coating with high hardness based on nanofillers and/or microfillers together with a TEOS, silane bond matrix etc.

The invention proposes the formulation of a hard coating based on the dispersion of said nanofillers and/or microfillers in an alcoholic or hydroalcoholic aqueous solvent which allows increasing the surface hardness of a stone substrate by more than 2 or 3 points in the Mohs scale.

Said development consists of a matrix of multifunctional molecules wherein one of the functional groups is capable of self-assembling or covalently bonding, thus being molecules with at least one of the following groups: Si—O (R=organic compound) or Si—Cl, aldehyde or ketone, CO or COOH, phosphates, sulfates, or the combination of one of these groups such as thiolphosphonate, which will produce a three-dimensional lattice due to a spontaneous self-assembly. Some of the used molecules are: thiols, alkoxysilanes, carboxylic acids, alkoxymetallates and phosphonic acids.

The second functional group is a group capable of initiating the polymerization of monomers in a controlled manner.

Some of the functional molecules used are: Tetraethyl orthosilicate, bis-1,2 (triethoxysilyl)ethane, 3-glycidoxypropyltrimethoxysilane, gamma-aminopropylsilane, dichlorodimethylsilane, bis-dichloromethylphenylsilane, and hexadecyltrimethoxysilane.

To favor the adhesion with the substrate of the fillers, the aqueous/hydroalcoholic medium can be acidified by means of adding acetic, hydrochloric, tartaric, ethylenediaminetetraacetic, etc., type acid which favor the self-assembly by means of creating silanol, carboxyl or phosphonate groups.

The micro and nanoparticles finally selected are stable in aqueous medium and/or colloidal solution and are added during the oligomerization of the developed molecule, thus allowing a good control of the percentage of nanofillers with additives.

The choice of the used fillers was made based on the composition, structure, size and cost thereof. Some of the fillers considered are:
Alumina ($Al_2O_3$)
Boron carbide ($B_4C$)
Boron nitride (BN)
Silicates
Glass microspheres
Silicon carbide (SiC)
Silica ($SiO_2$)
Quartz
Copper oxide (CuO)
Micro- and nanofibers To promote the molecular cross-linking between the surface of the stone substrate and the multifunctional nanostructured coating, a self-assembly (SAM) technology is used which allows creating strong bonds disregarding the polarity of the surfaces to be bound, furthermore maintaining the appearance of the original piece.

The self-assembly technology is based on the fact that the surface of some materials can be modified through a surface activation, which could consist of a moderate oxidation thereof, and/or of a chemical functionalization process using molecules capable of self-assembling.

This new technique provides an effective bond between the surface of the material and the coating of micro- and nanoparticles, due to the possibility of forming a molecular cross-linking in the surface while the appearance of the original piece is maintained.

Figure 6:
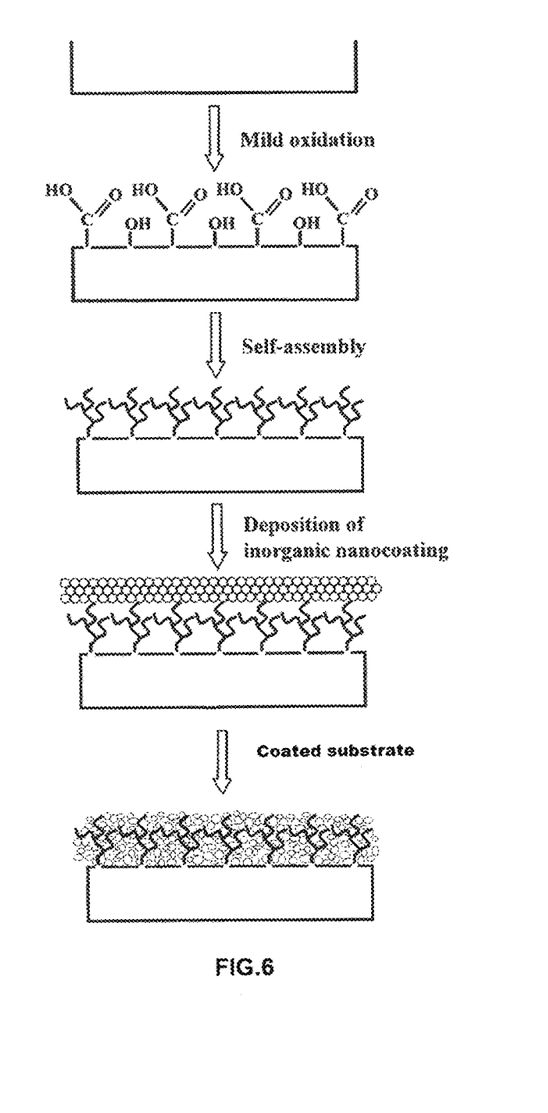
FIG. 6 schematically shows a self-assembly process on a substrate according to the principles of this invention: mild oxidation of the surface, self-assembly and deposition of the nanocomposite. This process can occur in 3 steps, in two steps and even in a single step.

This molecular anchoring process involves three steps: activation, self-assembly and co-deposition of micro- and nanoparticles. These three steps can be performed in a single step: activation, self-assembly and co-deposition of micro- and nanoparticles as is detailed in FIG. 6, when the molecules responsible for the activation and for creating three-dimensional lattices on the surface of the substrate and the micro- and nanofillers are in the same composition.

The first step involves an activation in moderate conditions of the surface of the substrate to be treated for the purpose of functionalizing it, creating optimal functional groups for the self-assembly of organic molecules in the surface thereof, for increasing the potentiality of said surface to give rise to self-assembly reactions.

The carboxyl and hydroxyl groups formed during the activation process (first step) provide the active sites so that the molecules are self-assembled with the suitable functional groups (second step). In said second step the self-assembly technique based on the formation of covalent bonds and other weaker interactions such as electrostatic or van der Waals interactions between the functional groups of the surface of the activated substrate and bi- or multifunctional organic molecules is applied. Thus, stable molecules chemically bound to the surface of the piece must be spontaneously produced.

In the third step, the co-deposition of inorganic micro- and nanoparticles with high hardness (SiC, BN, $SiO_2$, $TiO_2$, $ZrO_2$, quartz, alumina, $B_4C$, etc . . . ) occurs on the surface of the substrate to obtain a high quality coating. The micro- and/or nanoparticles are trapped in the lattice which said molecules are capable of forming, maximizing the matrix-particle interaction. The self-assembled molecules are bound to the surface by means of a chemical adsorption process (the binding of the adsorbate to the solid surface by forces where their energy levels are close to those of the chemical bonds) providing an effective binding between the substrate and the molecules.

These three phases can be reduced to a single one, to that end it is necessary to use in the same formulation the hard micro- and nanoparticles of the third phase and which will be co-deposited in the coating together with the molecules capable of functionalizing the surface of the substrate and creating three-dimensional lattices by means of self-assembly.

A hard, transparent coating is obtained with a binding by means of chemical or electrostatic interactions or bonds, which have a high abrasion resistance, maintaining mechanical properties.

Using this technology, from organic and inorganic precursors with the ability to form a three-dimensional lattice, different micro- and/or nanoparticles are encapsulated.

Figure 7:
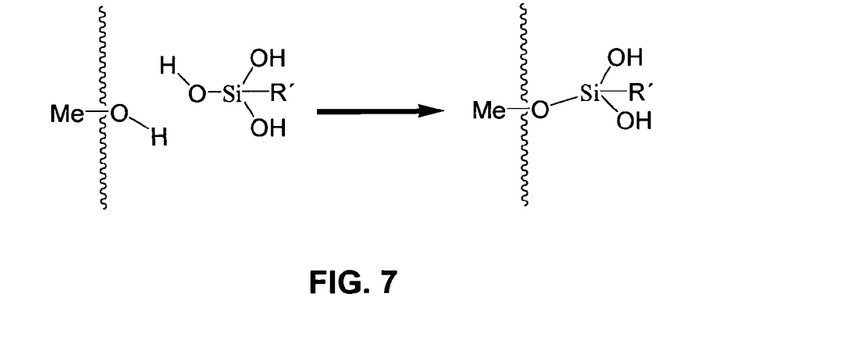
FIG. 7 shows the incorporation of silanols in the matrix due to a spontaneous self-assembly. In this process the dehydration and formation of the bond occurs.
Figure 8:
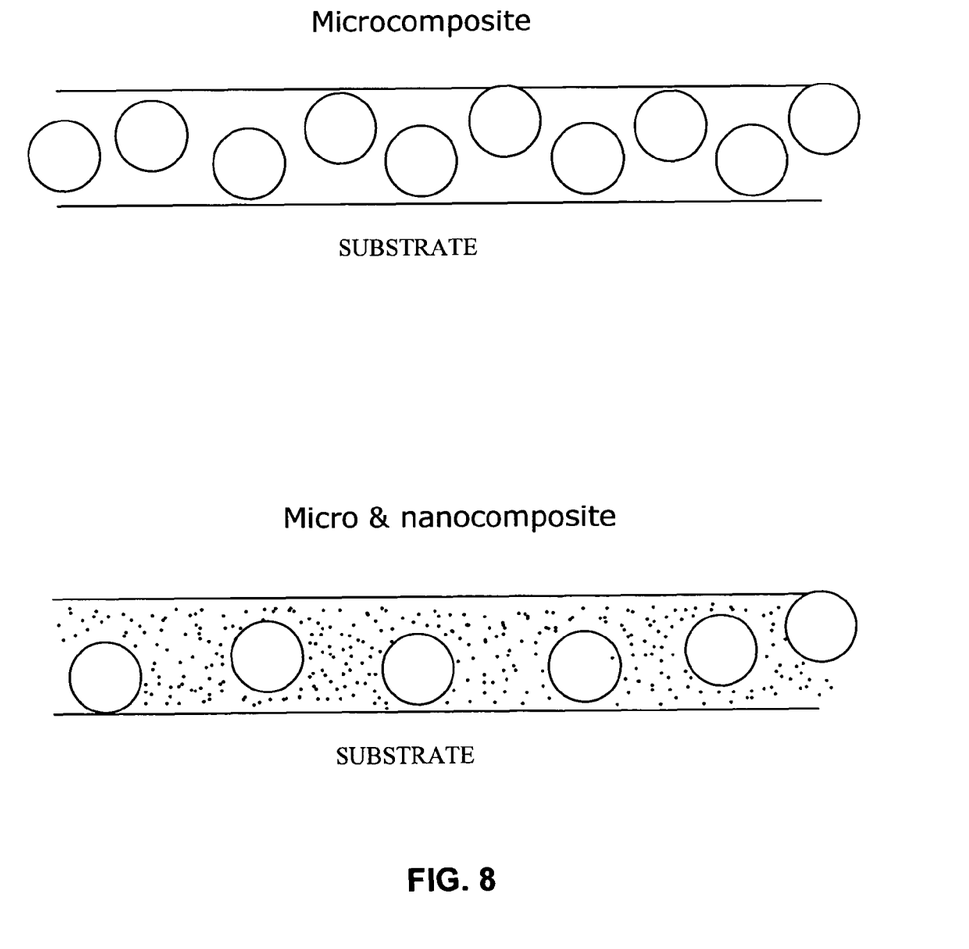
FIG. 8 shows in its top part a coating structure according to the invention with microparticles only, whereas in the bottom part a structure in which microparticles and nanoparticles are combined is depicted.

The incorporation in the matrix of multifunctional molecules with at least one of the following groups: Si—O or Si—Cl, CO or COOH, amine, carbonyl, free aldehyde groups, carboxyl, phosphates, sulfates, or the combination of one of these groups such as thiolphosphonate produces a three-dimensional lattice due to a spontaneous self-assembly as is shown in FIG. 7 (for the case of silanol groups).

With reference to the figures of the drawings, it must be emphasized that when the marble surface, formed mainly from crystalline structures of metal carbonates, the major one being calcium carbonate, is treated with compounds such as organosilanes, phosphonates, thiols, compounds with amino, aldehydes or carboxyl groups, a deposition of thin layers occurs on the $XCO_3$ units, giving rise to —O—X—O—Si type bonds, for the case of organosilanes.

For this type of material, silicon compounds form Si—O—Si—O type bonds, thus forming three-dimensional structures with excellent adherence to the marble substrate.

Figure 1:
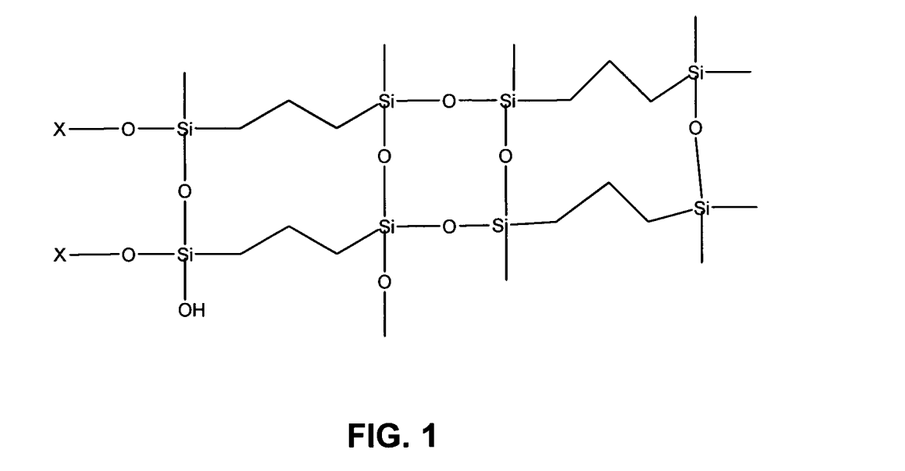
FIG. 1 schematically shows the self-assembly process on the substrate, this layer is formed from a hydroalcoholic organosilane solution. The cross-linking due to the dehydration of SiOH . . . HOSi units and which give rise to Si—O—Si bonds, occurs after a heat treatment at low temperatures.

If a hydroalcoholic-based solution of organosilanes is heat-treated at low temperatures, it gives rise to a dehydration of the silanol units which change from Si—OH to Si—O—Si type groups (with or without an organic chain), allowing a cross-linking between layers (FIG. 1).

Figure 2:
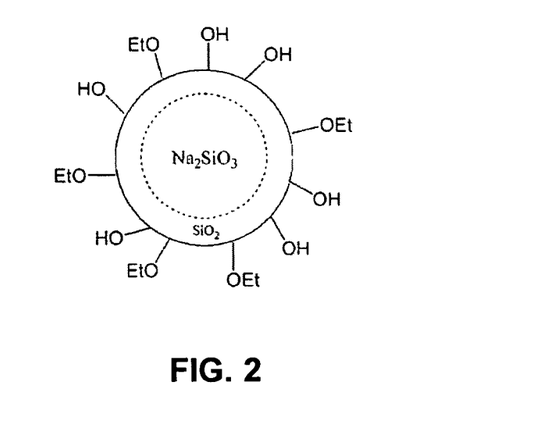
FIG. 2 shows a nanoparticle the structure of which is formed by 2 units, a core of a composition and an outer part of a different composition; an onion type nanoparticle.
Figure 3:
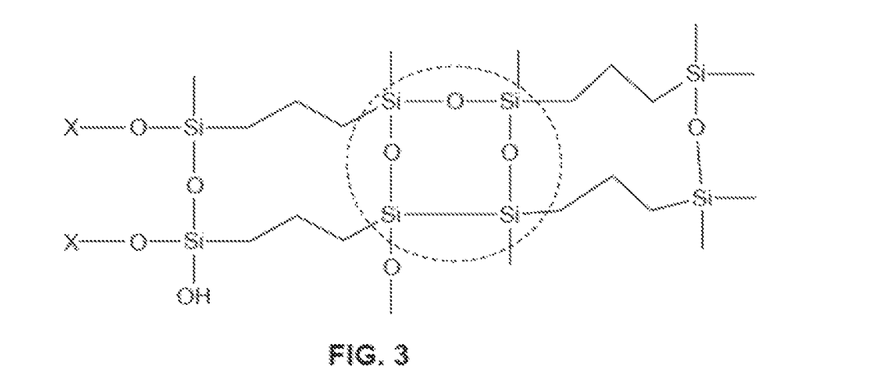
FIG. 3 shows a thin self-assembled layer on the surface of the substrate in which octanuclear $Si_4O_4$ units are shown.
Figure 4:
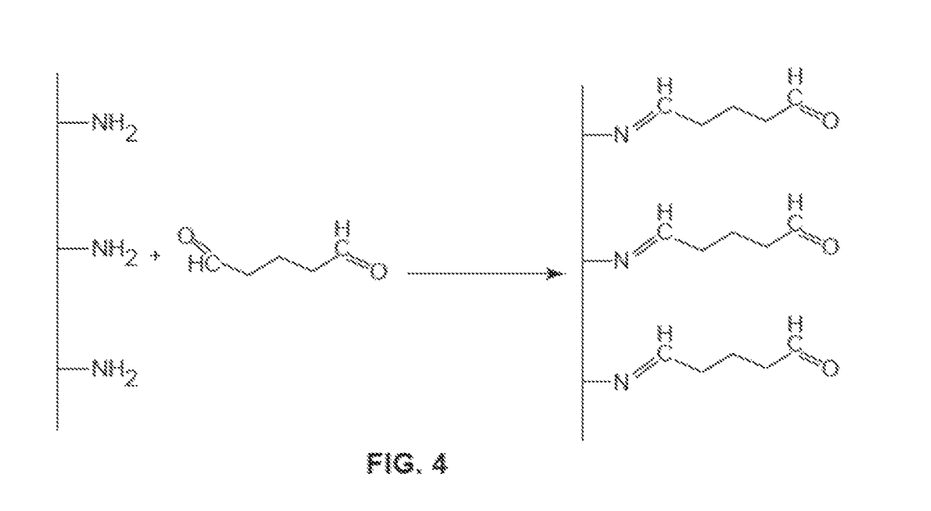
FIG. 4 shows other example of functionalization of surfaces and self-assembly based on the use of amino and aldehyde functional groups.
Figure 5:
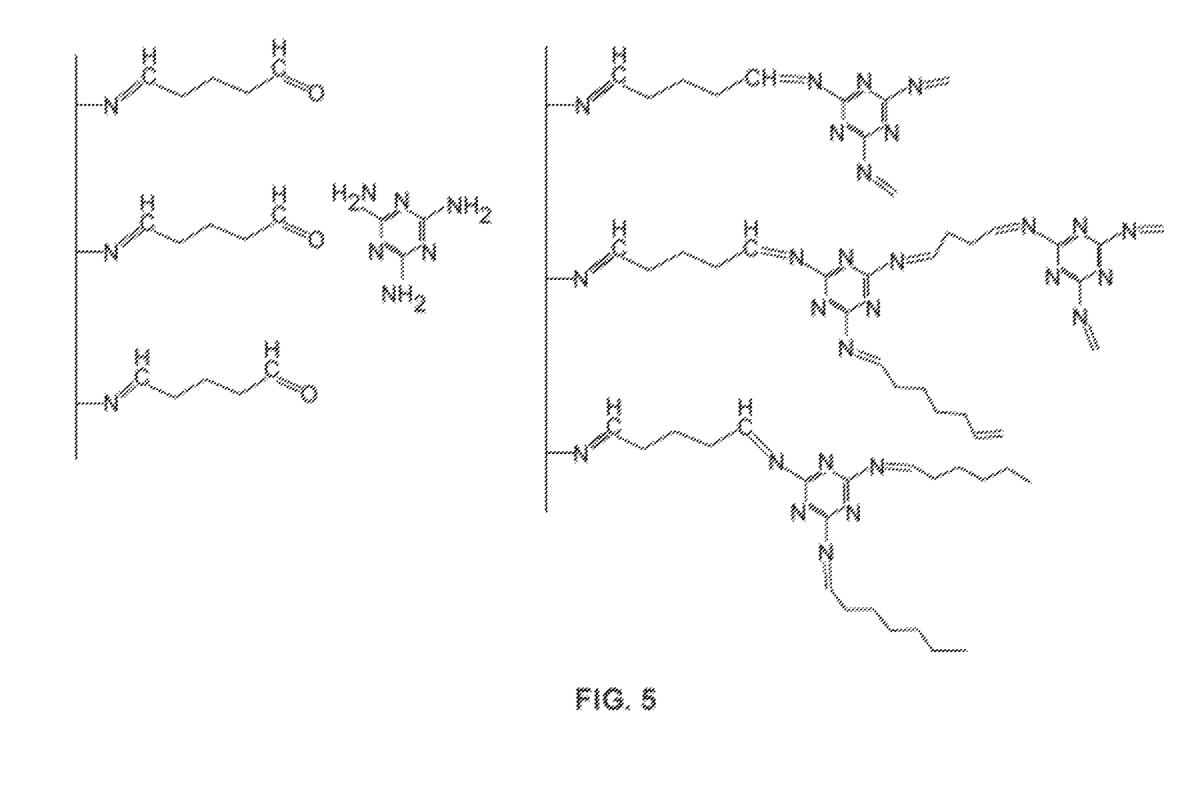
FIG. 5 shows an example in which molecules with aldehyde functional groups and triazines for the self-assembly process are used. The incorporation of triazines allows creating three-dimensional lattices.

According to the silane molecule used (BTSE; TEOS, GLYMO, etc . . . ), the structure of the nanoparticle can be formed by octanuclear units $(SiO)_4$ (FIG. 3), onion type (FIG. 2), etc . . . These silicon oxide (SiO) nanoparticles created "in situ" are deposited on the surface of the substrate and, by means of a self-assembly process, are chemically bound to the surface. Anther example of functionalization of surfaces and self-assembly is the reaction between bi- or multifunctional aldehydes and surfaces chemically modified with amine groups. In this case, reactions of self-assembly will occur between the amine functional groups and the aldehyde groups (FIG. 4). When molecules with aldehyde functional groups are used to give self-assembly reactions, different types of agents can be used which allow creating three-dimensional lattices by means of reaction with free aldehyde or hydroxyl groups. These molecules must have at least 3 free amino groups as for example melamine, tri- or tetraamines, etc. (FIG. 5).

Micro- and/or nanoparticles with a high hardness will be incorporated to the formulation to increase the hardness and wear resistance of the coating even more. Some nanostructured coatings are approximately three times more resistant than the coatings commonly used and last 40% more. With this method the nanoparticles can be directly applied to the surface of the coating and the final cost can be significantly reduced. Furthermore, the possibility of achieving a customized thickness from a nanolayer to microns contributes to a cost reduction.

The developed product consists of a novel coating with thicknesses between 100 nanometers and 500 microns formed by the co-deposition by means of the self-assembly of micro- and nanoparticles with high hardness, using to that end an organic or organometallic matrix with the capacity to give self-assembly reactions both on the surface of the substrate and between the components of the formulation, allowing the formation of three-dimensional lattices.

Until the optimal formulation of the coating was achieved, different types of functional molecules, solvents, as well as fillers varied in chemical composition, structural composition as well as particle size were tested.

The application parameters (layer thickness, drying temperatures, . . . ), treatment forms (immersion, gun spraying, . . . ), etc . . . also influence the qualitative result and final behavior of the coating.

All these factors affect the hydrophobicity of the coating, the surface tension generated, the correct cross-linking of the molecules, the more or less transparent appearance, bubble generation, the loss of adhesion causing for example afterwards a sticky surface, cracking, etc . . .

Therefore, the right combination of the correct binding agents, the activation of the suitable solvent medium, the optimal fillers, as well as the application method and some specific application parameters, finally lead to obtaining an effective and chemically stable coating.

Several Examples of implementation of the invention are detailed below by way of a non-limiting illustration.

EXAMPLE 1

1 ml of hydrochloric acid is added to a magnetically stirred ethanol/water (80 ml ethanol; 20 ml $H_2O$) hydroalcoholic solution. 55 ml of TEOS (tetraethyl orthosilicate) and 23 ml of GLYMO (3-glycidoxypropyltrimethoxysilane) are added. The solution is left stirring for 10 minutes and 5.4 g of alpha-silicon carbide with a particle size of 80 nm are added. The mixture is left stirring for 5 minutes and is applied on the surface of the artificial marble slabs.

It is left to dry in an oven at 120° C. for 25 minutes.

EXAMPLE 2

1 ml of hydrochloric acid is added to a magnetically stirred ethanol/water (80 ml ethanol; 20 ml $H_2O$) hydroalcoholic solution. 40 ml of TEOS (tetraethyl orthosilicate) and 40 ml of GLYMO (3-glycidoxypropyltrimethoxysilane) are added. The solution is left stirring for 10 minutes and 5.4 g of alpha-silicon carbide with a particle size of 1 micron are added. The mixture is left stirring for 5 minutes and is applied on the surface of the artificial marble slabs.

It is left to dry in an oven at 85° C. for 45 minutes

EXAMPLE 3

The artificial marble slab (substrate) is introduced in an aqueous solution of HCl at 3.5% by volume for 40 seconds at 25° C. The substrate is washed with water 3 times and the substrate is left to dry.

1 ml of hydrochloric acid is added to a magnetically stirred ethanol/water (80 ml ethanol; 20 ml $H_2O$) hydroalcoholic solution. 25 ml of TEOS (tetraethyl orthosilicate) and 55 ml of GLYMO (3-glycidoxypropyltrimethoxysilane) are added. The solution is left stirring for 10 minutes and 4.4 g of alpha-silicon carbide with a particle size of 1 micron and 1 g of alpha-silicon carbide with a particle size of 80 nm are added. The mixture is left stirring for 5 minutes and is applied on the substrate.

It is left to dry in an oven at 85° C. for 45 minutes

EXAMPLE 4

The artificial marble slab (substrate) is introduced in an aqueous solution of HCl at 3.5% by volume for 40 seconds at 25° C. The substrate is washed with water 3 times and the substrate is left to dry.

1 ml of hydrochloric acid is added to a magnetically stirred ethanol/water (80 ml ethanol; 20 ml $H_2O$) hydroalcoholic solution. 55 ml of TEOS (tetraethyl orthosilicate) and 25 ml of GLYMO (3-glycidoxypropyltrimethoxysilane) are added. The solution is left stirring for 10 minutes and 25 g of silica with a particle size of 6 microns are added. The mixture is left stirring for 5 minutes and is applied on the substrate.

It is left to dry in an oven at 85° C. for 45 minutes

By combining the new hard coating based on micro- and/or nanofillers and a formulated silane (or phosphonates) bond matrix and this binding technique with the substrate:

A stable coating on the substrate has been achieved.

Increasing the hardness of the substrate has been achieved.

Improving the scratch resistance of the substrate has been achieved.

The adherence of the coating to the substrate has been improved since a chemical bond between the coating and the polyester resin has been created.

The chemical resistance and resistance to detergents of the test pieces have been improved.

Working at low temperature has been achieved.

Work is carried out in a medium with low toxicity since the solvent used is an aqueous or hydroalcoholic medium, thus preventing harmful volatile emissions and without risk of irritation or other health risks for the person handling the solution.

EXAMPLE 5

Etching Test

Some marble pieces are polished and an etching and staining test is subsequently performed therein comparing with non-polished pieces. The result is that the polished pieces have been out of coating and are easily attacked by the hydrochloric acid.

The areas where it is observed that there is coating remain without alteration. In this case, the achieved hardness reaches 6 in the Mohs scale compared to 3 of the untreated piece. A certain splitting is seen but no scratch is observed nor does loss of material occur.

When hydrochloric acid and lye are poured, bubbling does not occur and no reaction occurs until several hours have elapsed. In contrast, an untreated piece is etched straightaway and the marble is immediately consumed.

The method of the invention allows achieving the following specific objectives:

Improvement of the behavior against abrasion without altering the original appearance of the substrate.

It does not affect other properties of the end product (bending, impact resistance, processability, physical characteristics, mechanical properties, etc.)

With this new treatment, a stable coating is formed which is long-lasting, mainly due to the high adherence on the substrate which is generated by means of the formation of robust interactions of electrostatic, covalent type, etc., between the coating and the substrate.

It works in a broad range of stone substrates based on a mixture of stone aggregates agglomerated by means of an organic binder. The binder used as a binding agent of the stone material being able to be both thermosetting and thermoplastic. The nature of the mineral varies according to the petrographic origin of the chosen natural stone (marble, limestone, quartz, granite, etc . . .)

It prevents agglomeration problems when working in bulk.

It reduces the generation of waste after the production process: decrease of the rejection of scratched pieces.

The additional costs of the end product are minimum.

There are no environmental risks or health risks since they are treatments based on volatile-free solvents.

Upon working at low temperature it is possible to have pieces without apparent degradation, unlike what can occur with more aggressive deposition systems such as those of plasma or corona.

The invention claimed is:

1. A method for coating a stone substrate based on a mixture of stone aggregates with materials selected from the group consisting of calcareous materials and dolomitic limestones that are agglomerated by means of a binder, the method comprising:

forming a coating layer over the stone substrate to increase hardness, chemical resistance, wear and scratch resistance, said forming of the coating layer comprising the steps of:

activating a surface of said stone substrate by means of selection from an oxidation of the surface and a chemical functionalization process, providing thereby active sites on the surface of the substrate; said sites having functional groups;

applying on said activated stone substrate a coating matrix incorporating at least one organic material selected from the group consisting of organosilanes, organophosphonates, polycarboxylic compounds and compounds based on triazine heterocycles, and further incorporating fillers selected from the group consisting of inorganic nanoparticles and inorganic microparticles;

chemically binding said coating matrix to the activated stone substrate by conducting a self-assembly process with the functional groups and a binding process selected from the group consisting of covalent bonding, electrostatic bonding, van der Waals bonding and hydrogen bonding, and any combination thereof; and drying said coating matrix, selecting the functional groups each from the group consisting of SI—OH, SiOR (R=organic compound), Si—CI, aldehyde, ketone, COOH, $NH_2$ phosphates, phosphonates, sulfonates, sulfates and any combination thereof;

selecting said inorganic nanoparticles and said inorganic microparticles from the group consisting of alumina, boron carbide, boron nitride, silicates, glass microspheres, silicon carbide, silica, quartz, copper oxide, micro- and nanofibers, core-shell particles, $Na_2SiO_3$ and any combination thereof; and wherein said chemically binding causes formation on the surface of the stone substrate a three-dimensional lattice by means of an interaction of the at least one organic material both with the surface of the substrate and between components of the coating matrix, wherein said three-dimensional lattice is bound to the surface of the activated stone substrate by chemical bonds and is encapsulating said nanoparticles and/or microparticles while maintaining an appearance of an original piece.

2. The method according to claim 1, wherein said coating matrix further comprises an organic or inorganic binder, an aqueous alcoholic or hydroalcoholic solvent and a cross-linking reaction accelerator.

3. The method according to claim 1, wherein said drying of the coating matrix comprises a step of applying heat to the coated substrate to accelerate a dehydration process of said functional groups and promote cross-linking thereof.

4. A method for coating a stone substrate, which is based on a mixture of stone aggregates with materials selected from the group consisting of calcareous materials and dolomitic limestones that are agglomerated by means of a binder, the method comprising:

activating a surface of said stone substrate by means of selection from an oxidation of the surface and a chemical functionalization process, providing thereby active sites on the surface of the substrate applying bi- or multifunctional organic molecules in the form of a hydroalcoholic-based solution of organosilanes on the activated surface of the stone substrate;

co-depositing inorganic microparticles and inorganic nanoparticles on the activated surface of the stone substrate to chemically bind the bi- or multifunctional organic molecules to the inorganic microparticles and inorganic nanoparticles to constitute a coating matrix;

heat treating the hydroalcoholic-based solution of organosilanes to give rise to dehydration of silanol units, which change from Si—OH to Si—O—Si groups to allow a cross-linking between the surface of the stone substrate and the coating matrix;

providing self-assembly from formation of covalent bonds and interactions between functional groups of the activated surface of the stone substrate and functional groups of the bi- or multifunctional organic molecules of the coating matrix to form a self-assembled, three-dimensional lattice in which is trapped and encapsulated the inorganic microparticles and the inorganic nanoparticles.

5. The method of claim 4, further comprising:
selecting functional groups of the bi- or multifunctional organic molecules from the group consisting of: Si—O—R (R=organic compound), Si—Cl, aldehyde, ketone, CO, COOH, phosphates, sulfates, and any combination thereof.

6. The method of claim 4, wherein the coating matrix is formed from a dispersion of the inorganic nanoparticles or the inorganic microparticles or a combination thereof, the inorganic nanoparticles or the inorganic microparticles being in an aqueous solvent that allows a surface hardness of the stone substrate to increase by more than 2 points of a Mohs scale, the aqueous solvent being selected from the group consisting of an alcoholic aqueous solvent and a hydroalcoholic aqueous solvent.

7. The method of claim 4, wherein the interactions are selected from the group consisting of electrostatic interactions and van der Waals interactions.

8. A method for coating a stone substrate based on a mixture of stone aggregates with materials selected from the group consisting of calcareous materials and dolomitic limestones that are agglomerated by means of a binder, the method comprising:

activating the surface of the stone substrate by means of selection from an oxidation of the surface and a chemical functionalization process, providing thereby aldehyde or hydroxyl functional groups on the surface of the stone substrate, effecting a reaction of the aldehyde or hydroxyl functional groups with amine functional groups of bi- or multifunctional organic molecules, the amine functional groups having at least three amino groups and co-depositing inorganic microparticles and inorganic nanoparticles on the surface of the activated stone substrate to chemically bind the bi- or multifunctional organic molecules to the inorganic microparticles and inorganic nanoparticles;

providing self-assembly by the bi- or multifunctional organic molecules and the activated surface of the stone substrate from reaction of the aldehyde or hydroxyl functional groups with the amine functional groups to form a self-assembled, three-dimensional lattice in which said inorganic microparticles and inorganic nanoparticles are trapped and encapsulated.

9. The method of claim 8, wherein self-assembly is from formation of covalent bonds and interactions between the amine functional groups of the bi- or multifunctional organic molecules, further comprising:
selecting the interactions from the group consisting of electrostatic interactions and van der Waals interactions.

10. The method of claim 8, wherein the self-assembly process is carried out with the at least three amino groups selected from the group consisting of melamine, triamines, and tetraamines.

11. A method for coating a stone substrate based on a mixture of stone aggregates with materials selected from the group consisting of calcareous materials and dolomitic limestones that are agglomerated by means of a binder, the method comprising giving rise to the coating by:

activating a surface of the stone substrate to create functional groups on the surface of the stone substrate with carboxyl and hydroxyl groups by means of selection from an oxidation of the surface and a chemical functionalization process, providing thereby carboxyl and hydroxyl functional groups on the surface of the stone substrate;

applying bi- or multifunctional organic molecules that have functional groups, and co-depositing inorganic microparticles and inorganic nanoparticles on the activated surface of the stone substrate to which the bi- or multifunctional organic molecules bond by chemical adsorption; and providing self-assembly from formation of covalent bonds and interactions between the functional groups on the surface of the activated surface of the stone substrate and the functional groups of the bi- or multifunctional organic molecules to form a self-assembled, three-dimensional lattice in which the inorganic microparticles and the inorganic nanoparticles are trapped and encapsulated.

12. The method of claim 11, wherein the functional groups of the bi- or multifunctional organic molecules are selected from the group consisting of: Si—O—R (R=organic compound), Si—Cl, aldehyde, ketone, CO, COOH, phosphates, sulfates, and any combination thereof.

13. The method of claim 11, wherein said inorganic nanoparticles or inorganic microparticles are co-deposited in a form of a dispersion in an aqueous solvent that allows a surface hardness of the stone substrate to increase by more than 2 points of a Mohs scale, the aqueous solvent being selected from the group consisting of an alcoholic aqueous solvent and a hydroalcoholic aqueous solvent.

14. The method of claim 11, wherein the coating is formed by a molecular anchoring process that effects the chemical binding.

15. The method of claim 14,
further comprising:
selecting the chemical binding from the group consisting of covalent bonding, electrostatic bonding, van der Waals bonding, hydrogen bonding and chemical adsorption, and any combination thereof.

* * * * *